A. J. COMBS.
Corn-Coverer.
No. 68,329. Patented Aug. 27, 1867.
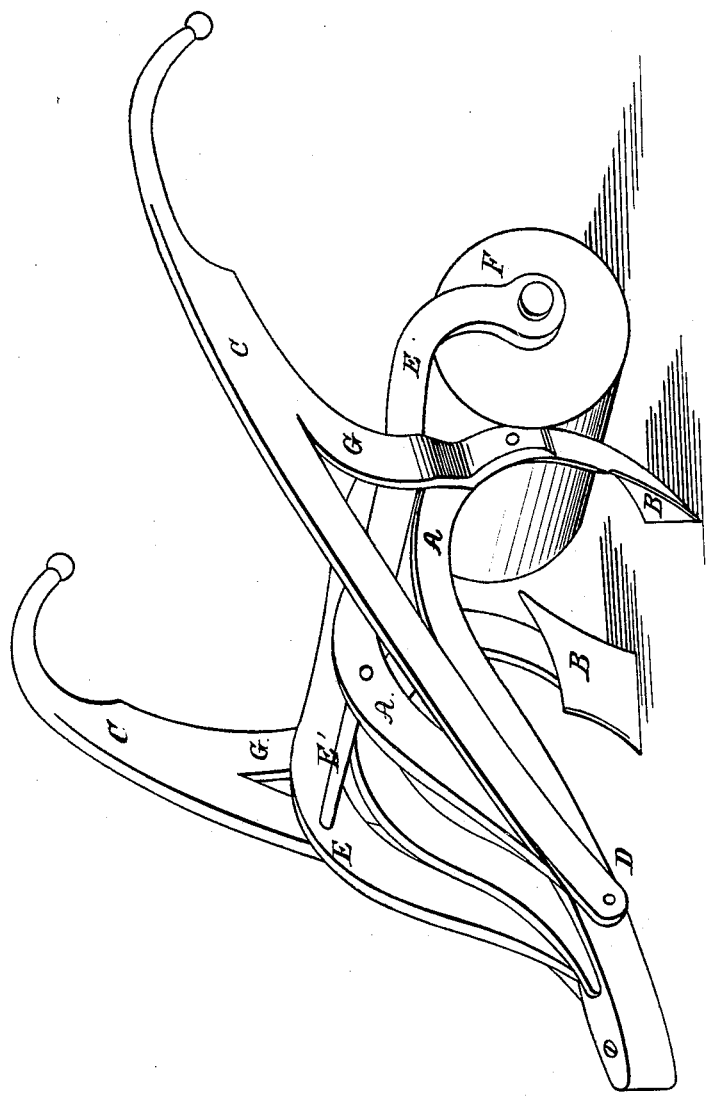
Witnesses:
Chas. D Smith
J E W Bowen
Inventor:
A J Combs
By Knight Bro.
Attorneys

United States Patent Office.

A. J. COMBS, OF OLNEY, ILLINOIS.

*Letters Patent No. 68,329, dated August 27, 1867.*

---

IMPROVEMENT IN CORN-COVERERS.

---

*The Schedule referred to in these Letters Patent and making part of the same.*

---

TO ALL WHOM IT MAY CONCERN:

Be it known that I, A. J. COMBS, of Olney, in the county of Richland, and State of Illinois, have invented a new and useful Improvement in Corn-Coverers; and I do hereby declare the following to be a full, clear, and exact description of the same, reference being had to the accompanying drawing, which is made part of this specification, and which is a perspective view of my improvement in corn-coverers.

In this implement a roller is employed in conjunction with a pair of covering-shovels, to pack the earth upon the corn to prevent its displacement and insure its germination. The frame bearing the roller is compactly situated between the handles, and has a pivotal attachment to the main frame to enable it to pass freely over irregular portions of ground and to override the obstructions.

In the drawing, A A are two curved bars or beams, joined together at their forward extremities and diverging rearward. These bars constitute the main frame, to which the horse may be hitched, and their down-turned rear ends carry covering-shovels B B, which are attached by rivets or otherwise. C C are the handles, the forward ends of which are attached to the beams A A by means of the bolt D, whose ends may be clinched to prevent the lateral detachment of the handles. The bolt D also affords pivotal attachment for the front ends of the bars E E, which are suitably bent or curved to carry the roller F in contact with the ground, said roller having its short journals fitted in bearings in the rear ends of the bars E E, which have an intermediate brace-rod, E'. Arms or braces G G, extending from the handles, are riveted or otherwise attached to the beams A A, and serve to give rigidity to said handles. In the construction of this implement iron alone may be employed, but of course wood may be used, if preferred.

In operation, the shovels B B, working at either side of the hill, serve to throw the earth inward, and the roller F, which follows the shovels, presses the earth compactly upon the corn. The pivoted frame E E, being situated between the handles, does not add to the dimensions of the implement when regarded only as a coverer, and it enables the roller F to conform to irregularities of the ground and to readily pass over obstacles.

Having thus described my invention, what I claim as new, and desire to secure by Letters Patent, is—

The combination of the frames A and E, handles C, roller F, and shovels B, all arranged and operating in the manner and for the purposes set forth.

To the above specification of my new and useful improvement in corn-coverers I have signed my hand this third day of July, 1867.

<div style="text-align:right">A. J. COMBS.</div>

Witnesses:
    E. F. BAXTER,
    WILLIAM SCOTT.